(12) United States Patent
Doi et al.

(10) Patent No.: US 11,764,952 B2
(45) Date of Patent: Sep. 19, 2023

(54) APPLICATION-KEY MANAGEMENT SYSTEM, APPLICATION-KEY MANAGEMENT DEVICE, APPLICATION-KEY MANAGEMENT METHOD, AND COMPUTER PROGRAM PRODUCT

(71) Applicant: KABUSHIKI KAISHA TOSHIBA, Tokyo (JP)

(72) Inventors: Kazuaki Doi, Kawasaki Kanagawa (JP); Yoshimichi Tanizawa, Yokohama Kanagawa (JP); Mamiko Kujiraoka, Kawasaki Kanagawa (JP); Akira Murakami, Tama Tokyo (JP); Ririka Takahashi, Setagaya Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 146 days.

(21) Appl. No.: 17/180,913

(22) Filed: Feb. 22, 2021

(65) Prior Publication Data
US 2021/0409202 A1 Dec. 30, 2021

(30) Foreign Application Priority Data
Jun. 25, 2020 (JP) .................................. 2020-109246

(51) Int. Cl.
*H04L 9/08* (2006.01)
(52) U.S. Cl.
CPC ............ *H04L 9/0852* (2013.01); *H04L 9/085* (2013.01); *H04L 9/0894* (2013.01)
(58) Field of Classification Search
CPC ...... H04L 9/0852; H04L 9/085; H04L 9/0894
(Continued)

(56) References Cited

U.S. PATENT DOCUMENTS

| 2014/0143867 A1* | 5/2014 | Tanizawa | H04L 9/0855 726/22 |
| 2015/0036825 A1* | 2/2015 | Tanizawa | H04L 9/0858 380/279 |

(Continued)

FOREIGN PATENT DOCUMENTS

| CN | 109194471 A | 1/2019 |
| CN | 110022213 A | 7/2019 |
| JP | 6129523 B2 | 5/2017 |

OTHER PUBLICATIONS

R. Takahashi et al., "A high-speed key management method for quantum key distribution network," 2019 11th Int'l Conf. on Ubiquitous and Future Networks (ICUFN), pp. 437-442 (2019).

*Primary Examiner* — Kambiz Zand
*Assistant Examiner* — Phuc Pham
(74) *Attorney, Agent, or Firm* — Finnegan, Henderson, Farabow, Garrett & Dunner, LLP (57) ABSTRACT

According to an embodiment, an application-key management system includes a plurality of application-key management devices and a comprehensive management device. The application-key management devices each include: a first memory configured to store an application key in one or more separated logical drives for each sharing destination of the application key shared by quantum cryptographic communication; and a first processor coupled to the first memory. The first processor is configured to: receive, from the comprehensive management device, a deletion request of specifying a logical drive storing the application key to be deleted among the logical drives; and delete the application key stored in the logical drive specified by the deletion request.

9 Claims, 8 Drawing Sheets

(58) Field of Classification Search
USPC .......................................................... 380/279
See application file for complete search history.

(56) References Cited

U.S. PATENT DOCUMENTS

2020/0120202 A1* 4/2020 Jakobsson ............. H04W 12/03
2020/0409683 A1* 12/2020 Fu ....................... G06F 11/0727

* cited by examiner

CORRESPONDENCE INFORMATION 43

| APPLICATION KEY | LOGICAL DRIVE (1) | LOGICAL DRIVE (2) | STORAGE AMOUNT |
|---|---|---|---|
| APPLICATION KEY AB | SITE A: D-DRIVE A | SITE B: D-DRIVE B | 10 GB |
| APPLICATION KEY AC | SITE A: E-DRIVE A | SITE C: D-DRIVE C | 2 GB |
| APPLICATION KEY BC | SITE B: E-DRIVE B | SITE C: E-DRIVE C | 8 GB |

APPLICATION-KEY HANDLING LOG

- 2020/06/01/10:00 ERASE ALL APPLICATION KEY AB (ERASE ALL APPLICATION KEYS AT SITE A: D-DRIVE A, SITE B: D-DRIVE B)
- ...

APPLICATION-KEY MANAGEMENT SYSTEM, APPLICATION-KEY MANAGEMENT DEVICE, APPLICATION-KEY MANAGEMENT METHOD, AND COMPUTER PROGRAM PRODUCT

CROSS-REFERENCE TO RELATED APPLICATIONS

This application is based upon and claims the benefit of priority from Japanese Patent Application No. 2020-109246, filed on Jun. 25, 2020; the entire contents of which are incorporated herein by reference.

FIELD

An embodiment described herein relates generally to an application-key management system, an application-key management device, an application-key management method, and a computer program product.

BACKGROUND

The advancement of information communication technology has led to the exchange of diverse data, and ensuring the confidentiality, security, and the like of transmitted information has become a major issue. Quantum cryptographic communication technology is expected to be implemented as a cryptographic technique that cannot be deciphered even if the computing power of a computer is improved.

With conventional technologies, however, it has been difficult to strictly manage an application key shared by quantum cryptographic communication.

DETAILED DESCRIPTION

According to an embodiment, an application-key management system includes a plurality of application-key management devices and a comprehensive management device. The application-key management devices each include: a first memory configured to store an application key in one or more separated logical drives for each sharing destination of the application key shared by quantum cryptographic communication; and a first processor coupled to the first memory. The first processor is configured to: receive, from the comprehensive management device, a deletion request of specifying a logical drive storing the application key to be deleted among the logical drives; and delete the application key stored in the logical drive specified by the deletion request.

With reference to the accompanying drawings, the following describes in detail an exemplary embodiment of an application-key management system, an application-key management device, an application-key management method, and a computer program product.

First Embodiment

First, examples of a basic configuration of a quantum cryptographic communication system will be described.

First Example of Basic Configuration

Figure 1:
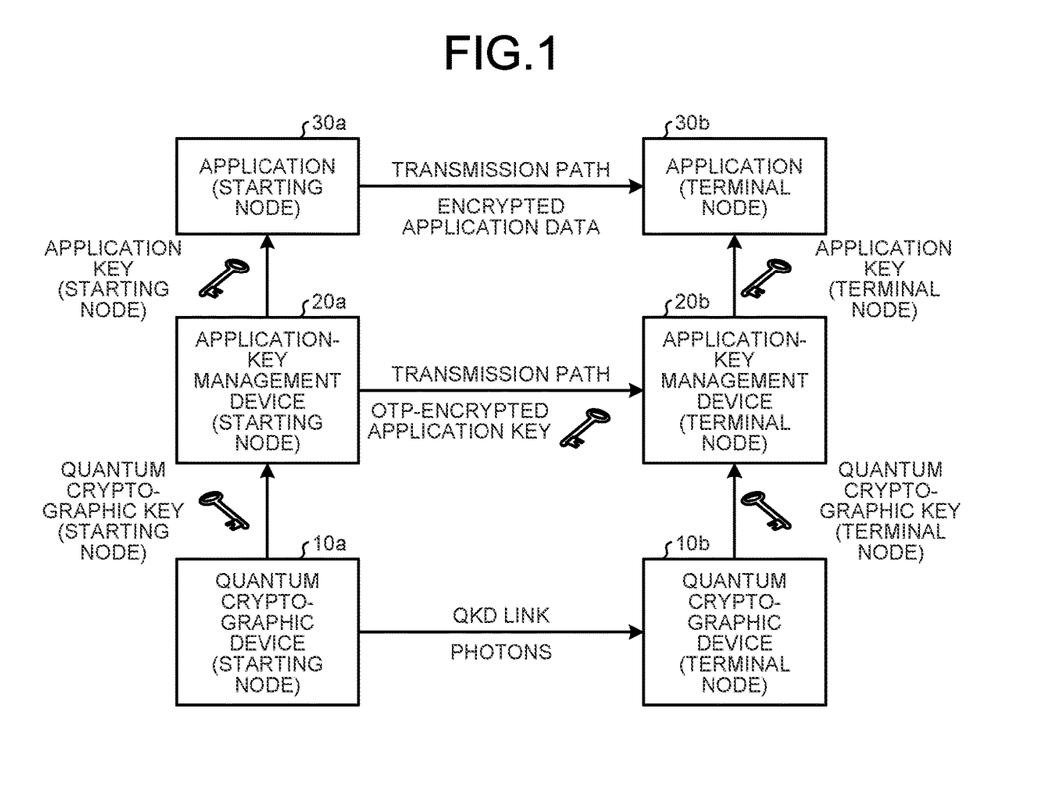
FIG. 1 is a diagram illustrating a first example of a basic configuration of a quantum cryptographic communication system according to an embodiment.

FIG. 1 is a diagram illustrating a first example of the basic configuration of the quantum cryptographic communication system according to a first embodiment. First, a quantum cryptographic device 10a (starting node) transmits photons that are the source of a quantum cryptographic key to a quantum cryptographic device 10b (terminal node) via a quantum key distribution (QKD) link. The quantum cryptographic device 10a generates a quantum cryptographic key (starting node) based on the transmitted photons, and the quantum cryptographic device 10b generates a quantum cryptographic key (terminal node) based on the received photons. The quantum cryptographic key (starting node) and the quantum cryptographic key (terminal node) are shared bit data and are identical. Then, the quantum cryptographic device 10a transmits the quantum cryptographic key (starting node) to an application-key management device 20a (starting node), and the quantum cryptographic device 10b transmits the quantum cryptographic key (terminal node) to an application-key management device 20b (terminal node).

Subsequently, the application-key management devices 20a and 20b share an application key. The application key is a cryptographic key used when an application 30a (starting node) encrypts and transmits application data.

A sharing method of application key will be described. The sharing method is basically as described in non-patent literature of R. Takahashi, Y. Tanizawa, and A. Dixon, "A high-speed key management method for quantum key distribution network" 2019 Eleventh International Conference on Ubiquitous and Future Networks (ICUFN), Zagreb, Croatia, 2019, pp. 437-442, for example. First, the application-key management device 20a generates an application key by a random number generator and the like. Then, the application-key management device 20a performs one time pad (OTP) encryption using a quantum cryptographic key on the application key and generates an OTP-encrypted application key. The application-key management device 20a transmits the OTP-encrypted application key to the application-key management device 20b. The OTP-encrypted application key is transmitted and received via a transmission path (wired or wireless) corresponding to the QKD link. The application-key management device 20b performs OTP decryption using a quantum cryptographic key on the OTP-encrypted application key and decrypts the application key. In this way, the application key is shared by the application-key management devices 20a and 20b.

The applications 30a and 30b acquire the application key from the application-key management devices 20a and 20b, respectively, at any desired timing. Specifically, after the application 30a retrieves the application key from the application-key management device 20a, the application 30b acquires from the application-key management device 20b the application key identical to the application key acquired by the application 30a.

After the application key is shared by the applications 30a and 30b, when the application 30a transmits application data, the application 30a performs encryption using the application key on the application data and transmits the application data. The devices on which the applications 30a and 30b operate are any device such as a smart device, a personal computer, and the like, for example. This is the description of the basic configuration.

Figure 2:
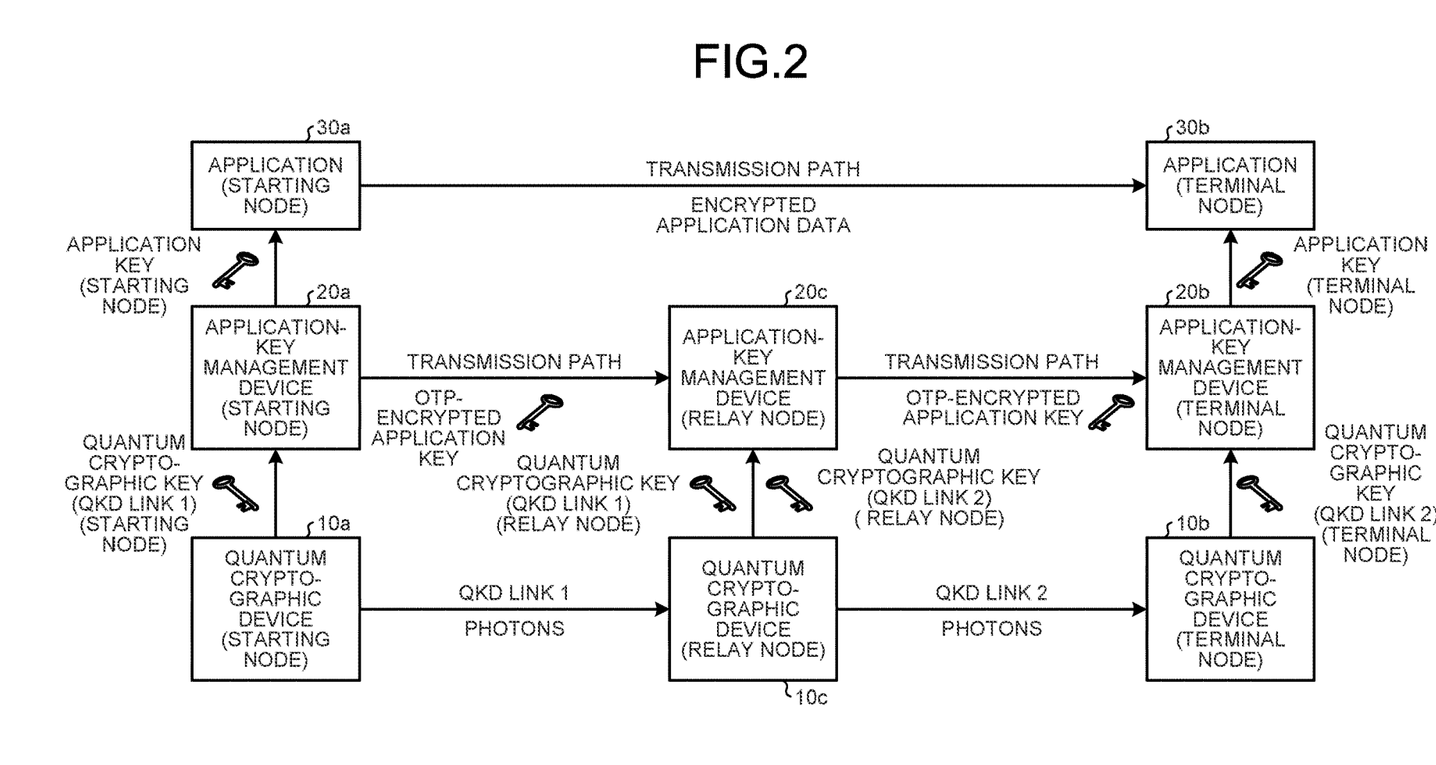
FIG. 2 is a diagram illustrating a second example of the basic configuration of the quantum cryptographic communication system of the embodiment.

In FIG. 1, although the starting node and the terminal node are directly connected, the basic operation is the same even when a relay node is interposed between the starting node and the terminal node. FIG. 2 illustrates the configuration in which one relay node is interposed between the starting node and the terminal node.

Second Example of Basic Configuration

FIG. 2 is a diagram illustrating a second example of the basic configuration of the quantum cryptographic communication system of the first embodiment. When one quantum cryptographic device 10c (relay node) is interposed, the number of QKD links (optical fibers) is two. In a QKD link 1, the quantum cryptographic device 10a (starting node) and the quantum cryptographic device 10c (relay node) share a quantum cryptographic key (QKD link 1), and in a QKD link 2, the quantum cryptographic device 10c (relay node) and the quantum cryptographic device 10b (terminal node) share a quantum cryptographic key (QKD link 2).

When the application 30a (starting node) and the application 30b (terminal node) share an application key, the application-key management device 20a first encrypts and transmits the application key to an application-key management device 20c, by using the quantum cryptographic key (QKD link 1). Then, the application-key management device 20c encrypts and transmits the application key to the application-key management device 20b, by using the quantum cryptographic key (QKD link 2). The applications 30a and 30b acquire the application key from the application-key management devices 20a and 20b, respectively, at any desired timing. This completes the sharing of the application key between the starting node and the terminal node. The operation of the applications 30a and 30b after sharing the application key is the same as that of FIG. 1.

Next, the functional configuration of the application-key management device of the embodiment will be described.

Example of Functional Configuration

Figure 3:
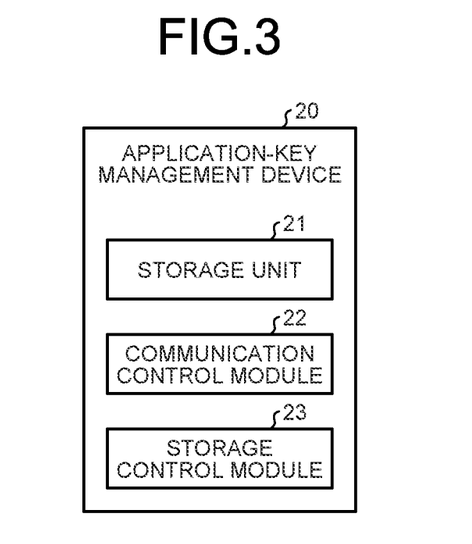
FIG. 3 is a diagram illustrating an example of a device configuration of an application-key management device of the embodiment.

FIG. 3 is a diagram illustrating an example of a device configuration of an application-key management device 20 of the embodiment. The application-key management device 20 of the embodiment includes a storage unit 21, a communication control module 22, and a storage control module 23. The application-key management device 20 may be connected to a quantum cryptographic communication device 10 or may be built into the quantum cryptographic communication device 10.

The storage unit 21 stores an application key in one or more logical drives separated for each sharing destination of the application key shared by quantum cryptographic communication.

The communication control module 22 controls communication performed with other devices. For example, when a failure occurs, the communication control module 22 transmits a failure notification to a comprehensive management device that comprehensively manages logical drives sharing the application keys. Examples of the failure include a case in which the application-key management device 20 malfunctioned, a case in which a disaster occurred at the site where the application-key management device 20 is placed, a case in which the site where the application-key management device 20 is installed was subjected to a cyberattack by a hacker and the like (for example, an unauthorized intrusion or the like), and the like.

Furthermore, the communication control module 22 receives, from the comprehensive management device, a deletion request in which a logical drive storing the application key to be deleted is specified, for example.

The storage control module 23 performs storage control of information stored in the storage unit 21. For example, the storage control module 23 deletes the application key stored in the logical drive specified by the deletion request. As for the deletion method of application keys, a method according to various guidelines using a data sanitization method including the zero-write method, the random-write method, and the like is taken.

Configuration Example of Logical Drives

Figure 4:
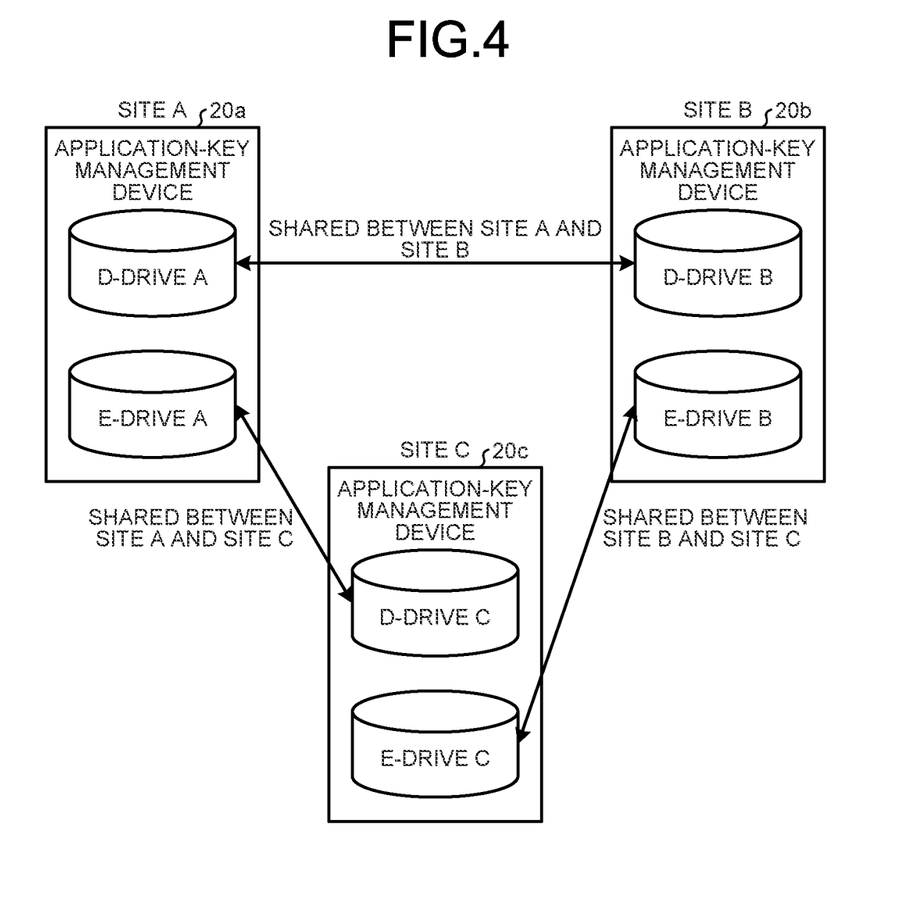
FIG. 4 is a diagram illustrating a configuration example of logical drives sharing application keys of the embodiment.

FIG. 4 is a diagram illustrating a configuration example of logical drives sharing application keys of the embodiment. The example in FIG. 4 illustrates a case in which the application-key management devices 20a to 20c are placed at three sites (A site, B site, and C site). The application-key management devices 20a to 20c share the application keys by separating logical drives for each site of the sharing destination.

In the application-key management device 20a, as logical drives to store the application keys, a D-drive A and an E-drive A are created. In the application-key management device 20b, as logical drives to store the application keys, a D-drive B and an E-drive B are created. In the application-key management device 20c, as logical drives to store the application keys, a D-drive C and an E-drive C are created.

The application key used at the sites A and B is shared by associating the D-drive A of the application-key management device 20a with the D-drive B of the application-key management device 20b. The application key used at the sites A and C is shared by associating the E-drive A of the application-key management device 20a with the D-drive C of the application-key management device 20c. The application key used at the sites B and C is shared by associating the E-drive B of the application-key management device 20b with the E-drive C of the application-key management device 20c.

Next, an example of a functional configuration of the comprehensive management device will be described.

Example of Functional Configuration

Figure 5:
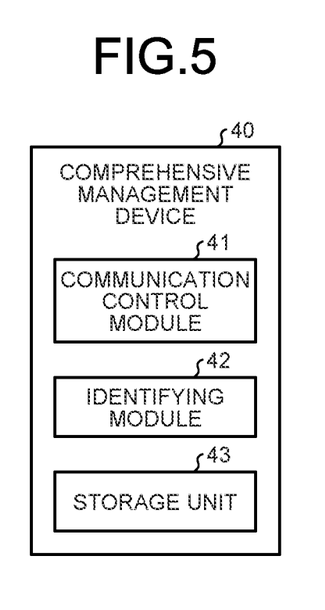
FIG. 5 is a diagram illustrating an example of a functional configuration of a comprehensive management device of the embodiment.

FIG. 5 is a diagram illustrating an example of the functional configuration of a comprehensive management device 40 of the embodiment. The comprehensive management device 40 of the embodiment includes a communication control module 41, an identifying module 42, and a storage unit 43.

The communication control module 41 controls communication performed with other devices. For example, the communication control module 41 receives a failure notification from the application-key management device 20 for which a failure occurred.

The identifying module 42 identifies one or more logical drives associated with one or more logical drives of the application-key management device 20 for which the failure occurred.

The storage unit 43 stores therein correspondence information indicating the combinations of logical drives sharing application keys, and a handling log of the application keys.

Figure 6:
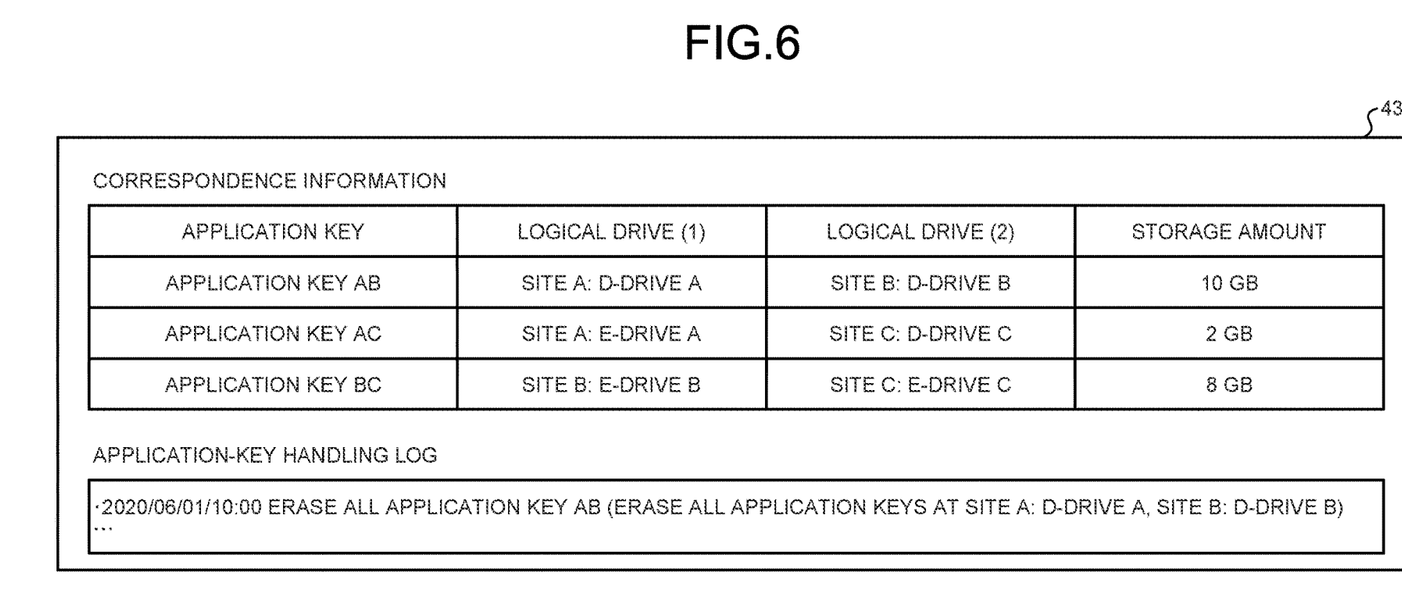
FIG. 6 is a diagram illustrating an example of information stored in a storage unit of the comprehensive management device of the embodiment.

FIG. 6 is a diagram illustrating an example of the information stored in the storage unit 43 of the comprehensive management device 40 of the embodiment. The correspondence information includes information on the entire application keys stored in the quantum cryptographic communication system. In the example of the correspondence information in FIG. 6, the combination of logical drives sharing an application key and the storage amount of the application key are managed for each application key shared between the sites.

For example, an application key AB is an application key shared between the site A and the site B, an application key AC is an application key shared between the site A and the site C, and an application key BC is an application key shared between the site B and the site C.

The combination of logical drives is a combination of logical drives by which the application key is shared. For example, the combination of logical drives by which the application key AB is shared is the D-drive A of the site A with the D-drive B of the site B. The same applies to the application key AC and the application key BC.

The storage amount is the amount of application key stored in each logical drive. In the example in FIG. 6, the D-drive A of the site A stores therein an application key of 10G bytes, and the D-drive B of the site B stores therein an application key of 10G bytes. The storage amount is acquired as the comprehensive management device 40 is notified from each application-key management device 20, for example.

The handling log of application keys is a log indicating the handling of application keys stored in the quantum cryptographic communication system. In the example of the correspondence information in FIG. 6, the log concerning the handling of the application key AB, the application key AC, and the application key BC is logged. For example, in the case of erasing all application key AB, the log includes the date and time the event occurred, an event type (erasure event of application key), and a status of execution on the logical drive corresponding thereto (erased all application key).

Next, an operation example of an application-key management system 100 in the event of the occurrence of various failures such as cyberattacks, disasters, device malfunctions, and the like at the sites will be described.

Operation Example

Figure 7:
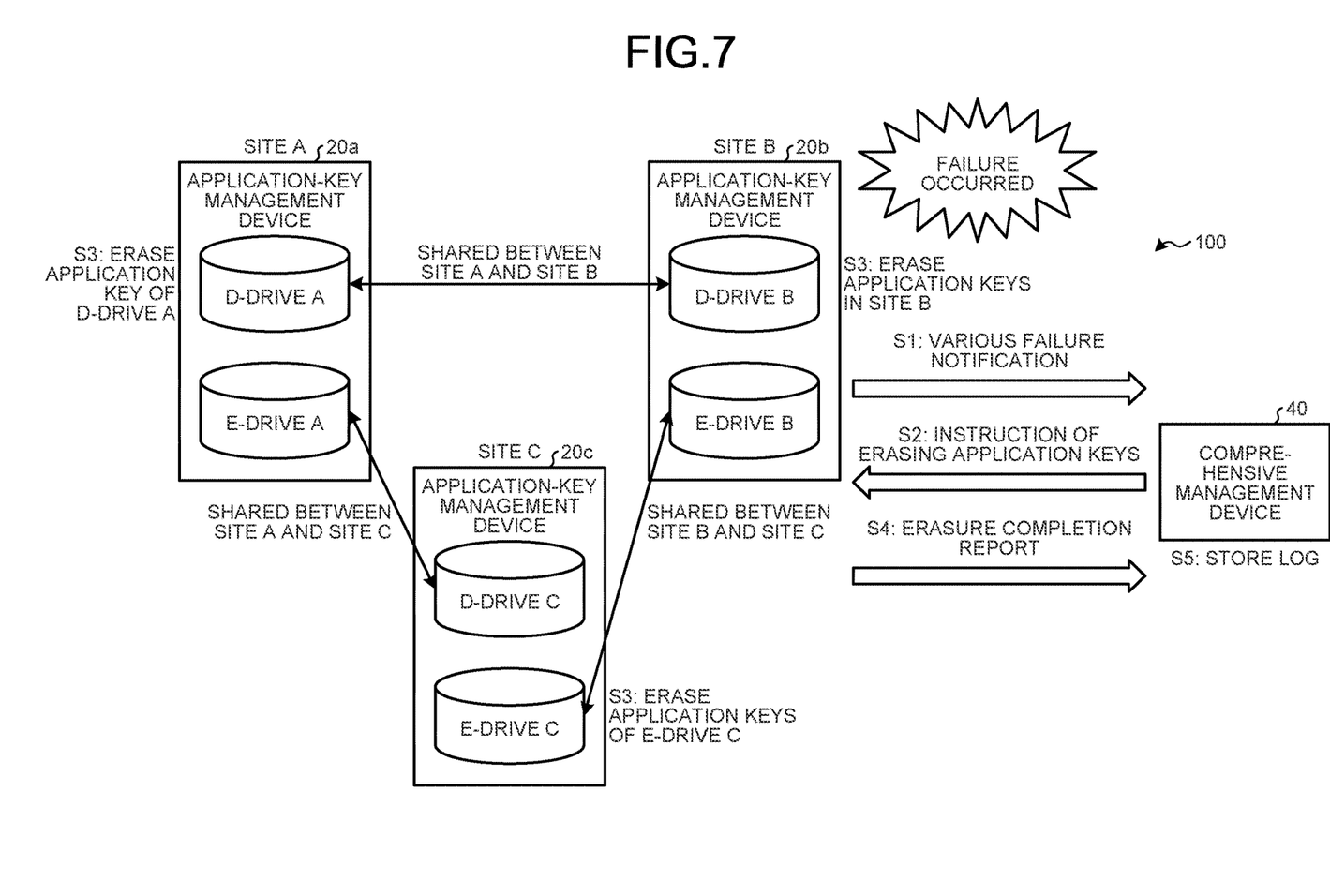
FIG. 7 is a diagram illustrating an operation example of an application-key management system of the embodiment.

FIG. 7 is a diagram illustrating an operation example of the application-key management system 100 of the embodiment. In the example in FIG. 7, an example in which a failure occurred on the application-key management device 20b at the site B will be described. First, the communication control module 22 of the application-key management device 20b transmits a failure notification to the comprehensive management device 40 (Step S1).

Next, the communication control module 41 of the comprehensive management device 40 gives instruction to erase the application keys stored in the site B where the failure occurred and the application keys of the logical drives storing the application keys sharing with the site B where the failure occurred (Step S2). Specifically, the identifying module 42 first identifies the D-drive A of the application-key management device 20a as the logical drive associated with the D-drive B of the application-key management device 20b and identifies the E-drive C of the application-key management device 20c as the logical drive associated with the E-drive B of the application-key management device 20b. The communication control module 41 transmits a deletion request in which the D-drive B and the E-drive B are specified to the application-key management device 20b, transmits a deletion request in which the D-drive A is specified to the application-key management device 20a, and transmits a deletion request in which the E-drive C is specified to the application-key management device 20c.

Next, each of the application-key management devices 20a to 20c that received the instruction of erasing the application keys from the comprehensive management device 40 erases the application key stored in the specified logical drive (Step S3). In the example in FIG. 7, the storage control module 23 of the application-key management device 20a erases the application key in the D-drive A, the storage control module 23 of the application-key management device 20b erases the application keys in the D-drive B and the E-drive B, and the storage control module 23 of the application-key management device 20c erases the application key in the E-drive C.

Then, the communication control module 22 of the application-key management device 20a transmits an erasure completion report of the application key in the D-drive A to the comprehensive management device 40, the communication control module 22 of the application-key management device 20b transmits an erasure completion report of the application keys in the D-drive B and the E-drive B to the comprehensive management device 40, and the communication control module 22 of the application-key management device 20c transmits an erasure completion report of the application key in the E-drive C to the comprehensive management device 40 (Step S4).

Next, the storage unit 43 of the comprehensive management device 40 stores the handling log of the application keys (Step S5). Specifically, the storage unit 43 stores a log indicating all erasure of the application key AB (erasing all application keys of the site A: D-drive A and the site B: D-drive B) and a log indicating all erasure of the application key BC (erasing all application keys of the site B: E-drive B and the site C: E-drive C).

As in the foregoing, in the application-key management system 100 of the embodiment, the storage unit 21 of the application-key management device 20 stores an application key in one or more logical drives separated for each sharing destination of the application key shared by quantum cryptographic communication. The communication control module 22 receives, from the comprehensive management device 40, a deletion request in which a logical drive storing the application key to be deleted is specified. Then, the storage control module 23 deletes the application key stored in the logical drive specified by the deletion request.

According to the application-key management system 100 of the embodiment, this makes it possible to manage the application keys shared by quantum cryptographic communication more strictly.

As for the storage of application keys, although it is conceivable to perform it on a directory basis, the advantages of managing the application keys on a logical drive basis as compared with a case of managing them on a directory basis are conceivable as follows:

First, there is an advantage of being able to reduce the collection amount of handling logs of application keys stored in the comprehensive management device 40. In the case of handling on a directory basis, there is a need to keep the logs on a per-directory basis, but in the case of a logical drive basis, the amount of log collection can be reduced as it is managed in units larger than that of a directory basis.

Then, there is an advantage of being able to reduce the number of instruction commands concerning the erasure of application keys to transmit from the comprehensive management device 40 to the application-key management device 20 executed in erasing the application keys.

In the event of various failures such as when a site was subjected to cyberattacks, when the application-key management device 20 malfunctioned, when a site suffered from a disaster, and the like and of needing to erase the application keys, it needs to erase as soon as possible all application keys of the other sites sharing with the site where the failure occurred. In the case of instructions on a directory basis, when performing the erasure, there is a need to transmit a large number of instruction commands from the comprehensive management device 40 to the application-key management device 20 as compared with performing it on a logical drive basis. In addition, when erasure completion reports are transmitted from the sharing destination sites, a large amount of report information is transmitted. When transmitting a large number of commands, it leads to a delay in erasure work and is difficult to erase them all promptly.

In particular, if there are a plurality of application-key storage directories in one logical drive and the site of the sharing destination of each application-key storage directory is different from each other, it needs to issue an erasure instruction to each erasure target directory. Although it is possible to reduce the number of instruction commands by devising the structure of the application-key storage directory, it is inevitable that the number of commands increases as compared with performing it on a logical drive basis.

Meanwhile, when application keys are managed on a logical drive basis like the application-key management system 100 of the embodiment, as compared with that on a directory basis, the number of commands transmitted can be reduced and the delay in erasure work of the application keys can be reduced. As a result, even in the event of various failures such as when a site was subjected to cyberattacks, when the application-key management device 20 malfunctioned, when a site suffered from a disaster, and the like, the application keys shared by the quantum cryptographic communication can be managed more strictly across the entire security system (the entire network of the quantum cryptographic communication system).

First Modification of Embodiment

Next, a first modification of the embodiment will be described. In the description of the first modification, the description the same as that of the embodiment will be omitted and portions different from the embodiment will be described. In the above-described embodiment, although the number of logical drives sharing application keys between two sites has been in units of one drive, the application keys may be shared in units of a plurality of logical drives. However, the number of logical drives shared between two sites needs to be the same.

Configuration Example of Logical Drives

Figure 8:
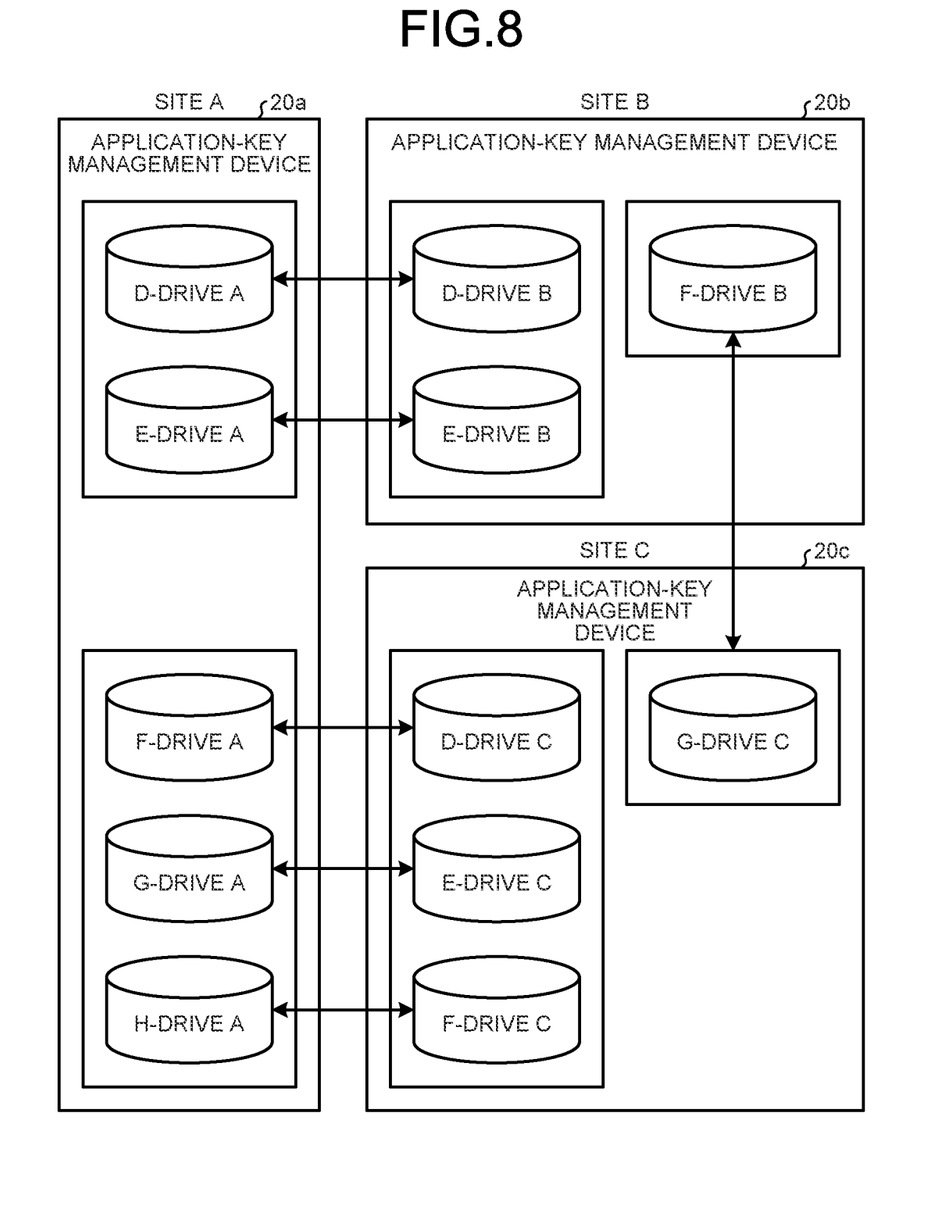
FIG. 8 is a diagram illustrating a configuration example of logical drives sharing application keys according to a first modification of the embodiment.

FIG. 8 is a diagram illustrating a configuration example of logical drives of the first modification of the embodiment. In the example in FIG. 8, the number of logical drives storing the application key AB shared between the site A and the site B is two. The number of logical drives storing the application key AC shared between the site A and the site C is three. The number of logical drives storing the application key BC shared between the site B and the site C is one. When the number of logical drives storing the application key that is shared between two sites is multiple, the application keys may be stored separating the logical drives for each application, or a plurality of logical drives may be used for the storage of the application key for a single application.

Second Modification of Embodiment

Next, a second modification of the embodiment will be described. In the description of the second modification, the description the same as that of the embodiment will be omitted and portions different from the embodiment will be described. In the above-described embodiment, the number of logical drives for sharing the application keys for each site has been fixed, but the number of logical drives may be varied depending on the situation.

For example, when the capacity of a logical drive storing the application key for one application is full or the like, the storage control module 23 of the application-key management device 20 creates a new logical drive as a logical drive to store the application key of the relevant application. However, the number of logical drives is increased such that the number of logical drives storing the application key shared between two sites is the same.

Not only the increase of logical drives, if the need to use them no longer exists, the storage control module 23 may decrease the number of logical drives storing the application keys. However, as with the increase of logical drives, the number of logical drives is decreased such that the number of logical drives storing the application key shared between two sites is the same.

When varying the number of logical drives, the communication control module 22 of the application-key management device 20 notifies the comprehensive management device 40 as needed. The identifying module 42 of the comprehensive management device 40 updates the correspondence information (see FIG. 6), upon receiving the notification from the application-key management device 20. Furthermore, the identifying module 42 also records in the storage unit 43 the log indicating that the number of logical drives has been changed and the like. In addition, the comprehensive management device 40 also transmits, to the application-key management device 20 of the sharing destination sharing the application key with the application-key management device 20 for which the number of logical drives has been changed, a request of changing the configuration of logical drives. As a result, the comprehensive management device 40 performs control so that the number of logical drives storing the application key shared between two sites is the same.

Specifically, when a new logical drive is created, for example, the communication control module 22 of the application-key management device 20 transmits, to the comprehensive management device 40, a logical-drive addition notification indicating the relevant new logical drive and the application-key management device 20 of the sharing destination of the application key stored in the relevant new logical drive. The identifying module 42 of the comprehensive management device 40 stores, based on the logical-drive addition notification, the new logical drive in the correspondence information. Then, the communication control module 41 transmits, to the application-key management device 20 of the sharing destination, a request of creating a logical drive associated with the new drive.

Furthermore, for example, when a logical drive sharing the application key is deleted, the communication control module 22 of the application-key management device 20 transmits, to the comprehensive management device 40, a logical-drive deletion notification indicating that the logical drive sharing the application key has been deleted. The identifying module 42 of the comprehensive management device 40 identifies, based on the correspondence information, the application-key management device 20 of the sharing destination having the logical drive sharing the application key stored in the deleted logical drive. The communication control module 41 transmits, to the application-key management device 20 of the sharing destination, a deletion request in which the logical drive associated with the deleted logical drive is specified.

Furthermore, for example, when a logical drive sharing the application key is changed (for example, when the D-drive A is changed to an I-drive A, and the like), the communication control module 22 of the application-key management device 20 transmits, to the comprehensive management device 40, a logical-drive change notification indicating that the logical drive sharing the application key has been changed. The identifying module 42 of the comprehensive management device 40 updates the correspondence information based on the logical-drive change notification and identifies, based on the updated correspondence information, the application-key management device 20 of the sharing destination having the logical drive sharing the application key stored in the changed logical drive. Then, the communication control module 41 notifies the application-key management device 20 of the sharing destination that the logical drive of the sharing destination of the application key has been changed.

Finally, an example of the hardware configuration of the quantum cryptographic communication device 10, the application-key management device 20, and the comprehensive management device 40 of the embodiment will be described.

Example of Hardware Configuration

Figure 9:
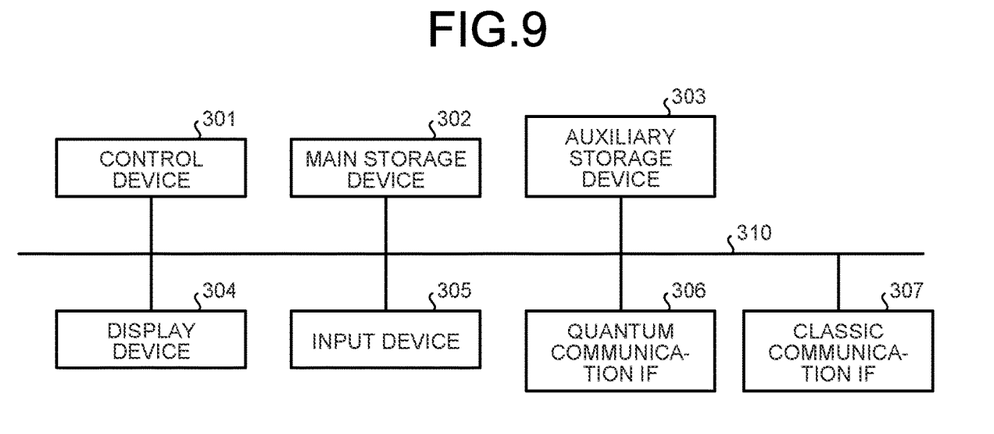
FIG. 9 is a diagram illustrating an example of a hardware configuration of a principal portion of a quantum cryptographic communication device of the embodiment.

FIG. 9 is a diagram illustrating an example of the hardware configuration of a principal portion of the quantum cryptographic communication device 10 of the embodiment. The quantum cryptographic communication device 10 of the embodiment includes a control device 301, a main storage device 302, an auxiliary storage device 303, a display device 304, an input device 305, a quantum communication interface (IF) 306, and a classic communication IF 307.

The control device 301, the main storage device 302, the auxiliary storage device 303, the display device 304, the input device 305, the quantum communication IF 306, and the classic communication IF 307 are connected via a bus 310.

The control device 301 executes a computer program that is read out from the auxiliary storage device 303 to the main storage device 302. The main storage device 302 is a memory such as a read only memory (ROM), a random access memory (RAM), and the like. The auxiliary storage device 303 is a hard disk drive (HDD), a memory card, and the like.

The display device 304 displays the status and the like of the quantum cryptographic communication device 10. The input device 305 receives the input from a user.

The quantum communication IF 306 is an interface for connecting to a QKD link. The classic communication IF 307 is an interface for connecting to a transmission path.

Figure 10:
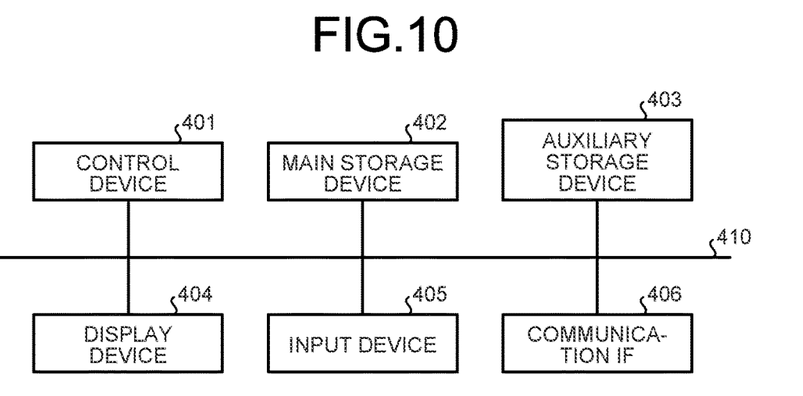
FIG. 10 is a diagram illustrating an example of a hardware configuration of a principal portion of the application-key management device and the comprehensive management device of the embodiment.

FIG. 10 is a diagram illustrating an example of the hardware configuration of a principal portion of the application-key management device 20 and the comprehensive management device 40 of the embodiment. The application-key management device 20 and the comprehensive management device 40 of the embodiment each include a control device 401, a main storage device 402, an auxiliary storage device 403, a display device 404, an input device 405, and a communication IF 406.

The control device 401, the main storage device 402, the auxiliary storage device 403, the display device 404, the input device 405, and the communication IF 406 are connected via a bus 410.

The control device 401 executes a computer program that is read out from the auxiliary storage device 403 to the main storage device 402. The main storage device 402 is a memory of a ROM, a RAM, and the like. The auxiliary storage device 403 is an HDD, a memory card, and the like.

The display device 404 displays the status and the like of the application-key management device 20 or the comprehensive management device 40. The input device 405 receives the input from a user.

The communication IF 406 is an interface for connecting to the transmission path.

The computer programs executed in the quantum cryptographic communication device 10, the application-key management device 20, and the comprehensive management device 40 of the embodiment are recorded in a computer-readable recording medium such as a CD-ROM, a memory card, a CD-R, a digital versatile disc (DVD), and the like in a file of an installable or executable format and provided as a computer program product.

Furthermore, the computer programs executed by the quantum cryptographic communication device 10, the application-key management device 20, and the comprehensive management device 40 of the embodiment may be stored in a computer connected to a network such as the Internet, and be provided by downloading via the network.

The computer programs that the quantum cryptographic communication device 10, the application-key management device 20, and the comprehensive management device 40 of the embodiment execute may be provided, without downloading, via a network such as the Internet.

The computer programs executed by the quantum cryptographic communication device 10, the application-key management device 20, and the comprehensive management device 40 of the embodiment may be provided by embedding in a ROM or the like in advance.

The computer program executed in the quantum cryptographic communication device 10 of the embodiment is in a modular configuration including, out of the functional configuration of the quantum cryptographic communication device 10 of the embodiment, the functions that can be implemented by the computer program. The functions implemented by the program are loaded onto the main storage device 302, as the control device 301 reads out and executes the computer program from a storage medium such as the auxiliary storage device 303 and the like. That is, the functions implemented by the computer program are generated on the main storage device 302.

Furthermore, the computer programs executed in the application-key management device 20 and the comprehensive management device 40 of the embodiment each are in a modular configuration including, out of the functional configuration of the application-key management device 20 or the comprehensive management device 40 of the embodiment, the functions that can be implemented by the computer programs. The functions implemented by the computer program are loaded onto the main storage device 402, as the control device 401 reads out and executes the computer program from a storage medium such as the auxiliary storage device 403 and the like. That is, the functions implemented by the computer program are generated on the main storage device 402.

A part or whole of the functions of the quantum cryptographic communication device 10, the application-key management device 20, and the comprehensive management device 40 of the embodiment may be implemented by the hardware such as an integrated circuit (IC) and the like. The IC is a processor that executes dedicated processing, for example.

When implementing various functions by using a plurality of processors, each processor may implement one out of the various functions or may implement two or more out of the various functions.

Furthermore, the operation mode of the quantum cryptographic communication device 10, the application-key management device 20, and the comprehensive management device 40 of the embodiment may be in any desired mode. The quantum cryptographic communication device 10, the application-key management device 20, and the comprehensive management device 40 of the embodiment may be made to operate as a quantum cryptographic communication system that implements cryptographic communication of a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An application-key management system comprising:
   a plurality of application-key management devices; and
   a comprehensive management device,
   each application-key management device being connected to other application-key management devices with each of which an application-key is shared by quantum cryptographic communication,
   the application-key management devices each comprising:
   a first memory configured to store the application key in a plurality of separated logical drives for each sharing destination of the application key; and
   a first processor coupled to the first memory and configured to:
   receive, from the comprehensive management device, a deletion request of specifying a logical drive storing the application key to be deleted among the logical drives; and
   delete the application key stored in the logical drive specified by the deletion request.

2. The system according to claim 1, wherein
   when a failure occurs, the first processor is configured to transmit a failure notification to the comprehensive management device,
   the comprehensive management device includes:
   a second processor configured to:
   receive the failure notification from a first application-key management device; and
   identify one or more second logical drives associated with one or more first logical drives of the first application-key management device, and
   the second processor is configured to transmit, to the first application-key management device, a first deletion request of specifying the one or more first logical drives, and transmit, to one or more second application-key management devices each including a second memory having the second logical drives, a second deletion request of specifying the second logical drives.

3. The system according to claim 2, wherein the second processor is configured to identify, from correspondence information indicating a combination of logical drives sharing the application key, the one or more second logical drives associated with the one or more first logical drives.

4. The system according to claim 3, wherein
   when a new logical drive is created, the first processor is configured to transmit, to the comprehensive management device, a logical-drive addition notification indicating the new logical drive and an application-key management device of a sharing destination of an application key stored in the new logical drive, and
   the second processor is configured to:
   store, based on the logical-drive addition notification, the new logical drive in the correspondence information; and
   transmit, to the application-key management device of the sharing destination, a request of creating a logical drive associated with the new logical drive.

5. The system according to claim 3, wherein
   when a logical drive sharing the application key is deleted, the first processor is configured to transmit, to the comprehensive management device, a logical-drive deletion notification indicating that the logical drive sharing the application key is deleted, and
   the second processor is configured to:
   identify, based on the correspondence information, an application-key management device of the sharing destination having a logical drive sharing the application key stored in the deleted logical drive; and
   transmit, to the application-key management device of the sharing destination, a deletion request of specifying the logical drive associated with the deleted logical drive.

6. The system according to claim 3, wherein
   when a logical drive sharing the application key is changed, the first processor is configured to transmit, to the comprehensive management device, a logical-drive change notification indicating that the logical drive sharing the application key is changed, and
   the second processor is configured to:
   update the correspondence information based on the logical-drive change notification and identifies, based on the updated correspondence information, an application-key management device of a sharing destination having a logical drive sharing the application key stored in the changed logical drive; and notify the application-key management device of the sharing destination that the logical drive of the sharing destination of the application key is changed.

7. The system according to claim 1, wherein a number of logical drives storing the shared application key is a same between a sharing destination and a sharing source of the application key.

8. An application-key management device comprising:

a first memory configured to store an application key in a plurality of separated logical drives for each sharing destination of the application key shared by quantum cryptographic communication; and a first processor coupled to the first memory and configured to:

receive, from a comprehensive management device, a deletion request of specifying a logical drive storing the application key to be deleted among the logical drives; and delete the application key stored in the logical drive specified by the deletion request, wherein the application-key management device is connected to other application-key management devices with each of which the application-key is shared.

9. A computer program product comprising a non-transitory computer-readable medium including programmed instructions, the instructions, when executed by a computer of an application-key management device storing an application key in a plurality of separated logical drives for each sharing destination of the application key shared by quantum cryptographic communication, causing the computer to execute:

receiving, from a comprehensive management device, a deletion request of specifying a logical drive storing the application key to be deleted among the logical drives; and deleting the application key stored in the logical drive specified by the deletion request, wherein the application-key management device is connected to other application-key management devices with each of which the application-key is shared.

\* \* \* \* \*